April 24, 1962   L. J. BRANCATO   3,031,004
METHOD OF PRODUCING SELF LOCKING WIRE INSERTS
Filed Dec. 3, 1958
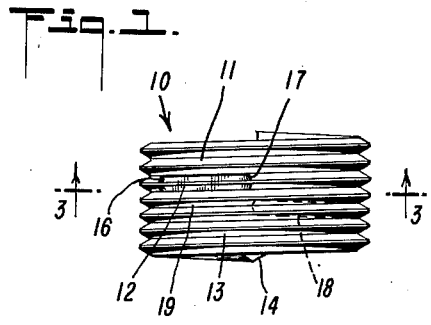
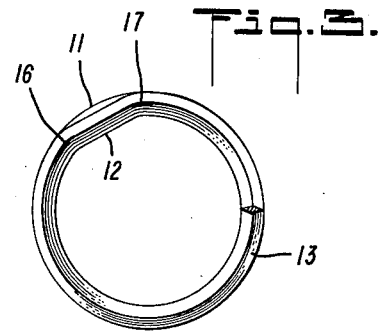
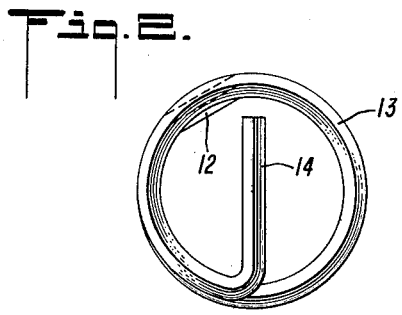
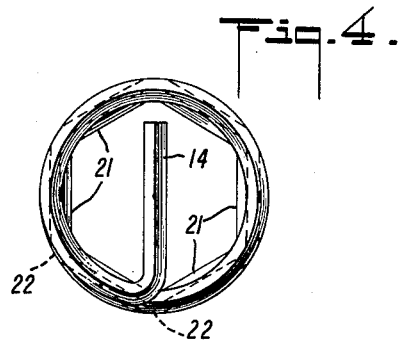
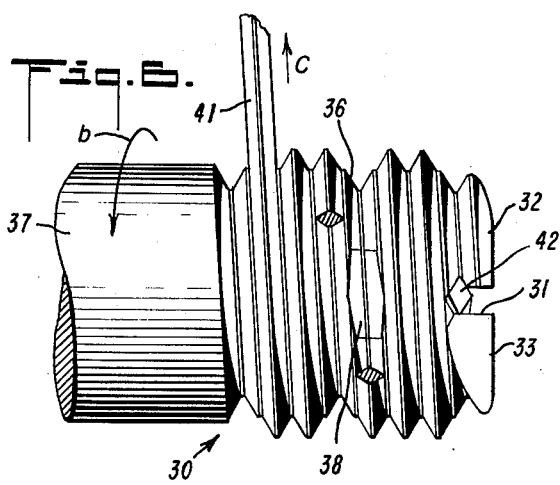
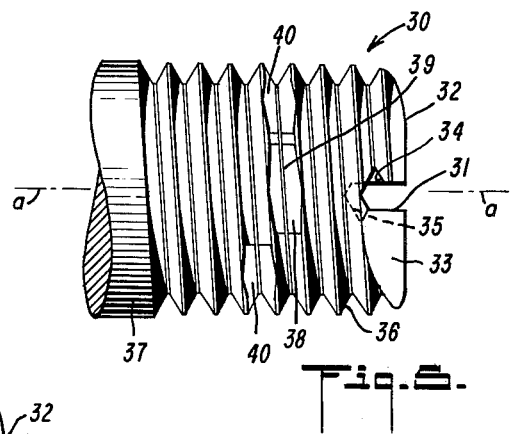
INVENTOR.
LEO J. BRANCATO
BY
ATTORNEY

United States Patent Office 3,031,004
Patented Apr. 24, 1962

3,031,004
METHOD OF PRODUCING SELF LOCKING WIRE INSERTS
Leo J. Brancato, Danbury, Conn., assignor to Heli-Coil Corporation, Danbury, Conn., a corporation of Delaware
Filed Dec. 3, 1958, Ser. No. 777,997
7 Claims. (Cl. 153—2)

The invention relates to a method of producing self-locking wire coil screw thread inserts of the kind described in my co-pending application for patent Serial No. 549,362, filed November 28, 1955, now Patent No. 2,874,741. Such a wire coil has inner and outer screw thread forming portions, for the application of a screw bolt to the inner portion and for the application of the insert with its outer portion to the cylindrical or tapped hole of a nut or boss member. The wire coils to be formed by the new method for the indicated purpose are to be cylindrical in general but provided with one or several straight line chordal portions intermediate two sets of helically wound convolutions which form the cylindrical coil body at both ends of the chordal portion or portions. According to one conventional method of producing such insert coils, circular convolutions or portions thereof have been transformed into polygonal convolutions by the pressure of grooved jaws. Applying another conventional method, one has tried to make inserts of the desired shape and accuracy by using a spring-coiling machine of the arbor-and-coiling-point type. This method involved interruptions of the continuous coiling and the bending during each intermission between two feeding periods of a coil of a length of wire equivalent to the chord length. However, the conventional methods were not satisfactory because the inserts did not turn out exact within permissible tolerances and because tool marking of the wire of the inserts could not be avoided.

The invention aims, therefore, to produce inserts of the mentioned kind which are free of the faults which accompany the conventional methods. The method according to the invention essentially comprises the starting of the insert by coiling a plurality of convolutions of equal pitch and equal diameter, thereupon forming a chordal portion or several of such portions by stretching the wire against a straight-lined surfaced portion or against several of such portions of a support and then continuing coiling convolutions of the first mentioned kind until the desired total number of convolutions has been coiled.

The invention also aims to make inserts by using the mentioned method wherein, however, the helix angle of the chordal portion is slightly larger than the helix angle of the circular convolutions in order to ensure the smooth transition from both the adjacent circular convolutions to the chordal portion, without any tool marks.

Further objects and details of the invention will be apparent from the following description and the accompanying drawing in which FIG. 1 is a side elevation of an insert produced by the method according to the invention, FIG. 2 is an end view of the insert, FIG. 3 is a section along line 3—3 in FIG. 1, FIG. 4 is an end view of a modified insert, FIG. 5 is a side elevation of a support in the form of a mandrel, FIG. 6 is a side elevation of a support similar to that of FIG. 5 with an insert being formed thereon.

Referring now to the drawing, FIG. 1 shows a screw thread insert made of a diamond shaped wire. Although in this figure as well as in all the other figures only wire with diamond-shaped cross-section, which is the one mostly used, has been shown, it will be apparent that the method according to the invention can be applied to wires of other cross-sections as well. The insert, in general denoted by 10, consists of a number of convolutions 11 forming an upper portion of the coil. Adjacent to that portion there is a straight-line chordal portion 12 followed by a second portion of circular convolutions 13. A tang 14 constitutes the ultimate lower end of the insert. The arrangement of the tang and the chordal portion are best visible in FIGS. 2 and 3, respectively. The chordal portion exercises the locking effect on a bolt screwed into the insert whereas the corners 16 and 17 at the ends of the chordal portion assist in anchoring the coil in the tapped hole of a nut or boss, not shown.

In order to increase the locking effect, more than one chordal portion may be applied. Thus, in FIG. 1 a second such portion is indicated in dash lines at 18. It will be noted that the portions 12 and 18 are separated by a circularly coiled portion 19, which may have any desired length. It is also possible to arrange a plurality of chordal portions closely adjacent to one another as in FIG. 4 where the coil has six chordal portions 21 with corners 22 formed between each two adjacent ones of such portions.

The mentioned tang 14 has a dual purpose. In the finished coil it serves as a grip for a tool when the coil is to be screwed in a tapped hole. In the production of the insert, the tang may serve as a grip in the coiling operation. However, it will be clear that the grip end may also have another conventional form, although the tang is the preferred form and, therefore, described hereinafter. In the method according to the invention, first, from a stock, the end of a substantially straight wire having certain springy properties is gripped whereby the tang is formed. Then a torque is applied to the tang which is rotated about an axis at right angles to the tang while the tanged end is simultaneously moved in the direction of the mentioned axis away from a stationary feeding point of the wire which is held under back tension. Thereby a predetermined first number of helical wire coil convolutions are formed. An equivalent step of the axial movement of the tang in order to provide the desired pitch would of course, be a movement of the wire-feeding point i.e. the point where the convolutions begin to start, in the axial direction relatively to a plane in which the tang is rotated. After the predetermined number of convolutions has been coiled, the straight line chordal portion is formed by stretching the wire by the mentioned back tension on a support which has a straight lined surface. Subsequent then to the chordal portion, a second number of convolutions is formed in the same manner as the first one. If the insert is coiled from continuous stock, the wire may be cut shortly before or after the last coil has been formed. However, it is of course possible to cut the wire stock to the required length before each insert is made so as to start the operation by forming the tang from the one end of the piece of wire cut to the desired length. In any event when the formation of the coil is completed and the coil is severed from the wire stock, the torque and back tension will be released. This will cause the coil springingly to expand. Thereby the tang will be freed from the grip and the coil will be disengaged from the mentioned support. When, then, the coil is being used it is common practice to contract it again so that the coil convolutions springingly seat and wedge into the thread groove of a job into which the coil is to be inserted. In other words, when in use the coil is contracted substantially to the dimensions with which it had been wound.

As stated hereinbefore, it is also possible, if so desired, to form more than one chordal portion which may or may not be separated from each other by intermediate circular convolutions or parts of such convolutions.

One of the objects of the invention is to avoid any tool marks on the coiled insert. Now I have found that such marks can be avoided particularly at the points especially dangerous in that respect where the transition of the chordal portion to and from the circular convolutions takes place. For this purpose, the helix angle between the end points of the chordal portion is slightly increased in relation to the helix angle, in general measured at the pitch diameter of the inner portions of the circularly coiled convolutions. In fact, this helix angle of the chordal portion is preferably selected equal to $\cot^{-1}(\pi DN)$ wherein D is the innermost diameter of the insert during the coiling which is substantially equal to the inner diameter of the insert when contracted for use, and N is the number of convolutions per inch of the coil length.

In order to carry through the method just described, a rotatable mandrel may be used, as shown in FIG. 5 and in general denoted by 30, having at its free end a slot 31 transverse to its axis $a$—$a$. The portions 32 and 33, extending forward at both sides of the slot, may be slanted as shown and undercut by grooves 34 and 35 according to the outer and inner portions, respectively, of the wire. The groove 35 adapted to receive the inner wire portion, is continued in a helical screw thread groove 36 which extends towards the other mandrel end 37 at least as far as the desired length of the insert to be coiled. The cross-section of that groove corresponds to the standard thread of the bolt to be applied to an insert formed with the aid of the mandrel. Where in the insert to be wound a chordal portion is desired, the arched groove 36 is interrupted by a straight ground portion, e.g. 38 which however, has substantially the same cross-sectional angle as the groove 36. The ends of the center line 39 of the straight ground portion are located in the groove 36 of the standard threads of the mandrel. This is necessary to permit the free transition to and from the standard thread groove. This condition can be achieved by slightly increasing the helix angle of the chord-forming portion 38 in respect to the helix angle of the standard thread, so that the first mentioned helix angle has the aforementioned value of $\cot^{-1}(\pi DN)$. FIG. 5 shows also additional ground portions 40 similar to the portion 38, whereby an insert may be formed substantially according to the one illustrated in FIG. 4.

FIG. 6 illustrates the production of an insert with the aid of a mandrel of the type of FIG. 5. The front end 42 of the wire 41 is first inserted in the slot 31 of the mandrel which then is rotated in the direction of the arrow $b$. Owing to the rotation of the mandrel, the wire will coil into the thread groove 36 so as to form first a plurality of standard convolutions. The wire is held under back tension during the coiling, as indicated by the arrow $c$. Now it will be clear that when the wire during the coiling reaches the ground portion 38 the wire will be stretched against this portion so as to form the desired chord. Thereafter, a desired number of standard convolutions may follow. It will be noted that in FIG. 6 a portion of the coiled wire is broken away to show the location of the chord-forming portion 38 and that additional chord-forming portions may be provided, as shown at 40 in FIG. 5. During the coiling the mandrel 37 may be shifted towards the right hand side if the point where the wire runs on the mandrel is in fixed location. Or, if the mandrel is axially non-movable, the wire during the coiling will move towards the left hand side. The wire may be cut either before or after an insert has been completed. When the finished insert is relieved of the torque and back tension, it will springingly expand so that the tang leaves the mandrel slot and that the insert can be readily stripped off the threaded mandrel.

It will be apparent to those skilled in the art that modifications and alterations of the method described can be provided without departure from the essence and spirit of the invention which for that reason shall not be limited but by the scope of the appended claims.

I claim:

1. A method of making a self-locking wire coil screw thread insert which comprises the steps of gripping a short end portion of a springy wire of a stock, wherein said wire has a diamond-shaped cross-section, then, while holding the gripped end portion straight, winding the wire about a screw threaded mandrel by rotating said mandrel and said gripped end portion about the axis of said mandrel substantially at right angles to the plane of said gripped end and simultaneously causing a relative movement in the direction of said axis between said rotating gripped end and a stationary feeding point of the wire so as to form said wire into a first predetermined number of equally pitched convolutions of equal diameter and with the point of one of the acute angles of the diamond wire cross-section closest to said axis while holding said forming convolutions in coaxial relationship to each other on said mandrel, further forming a subsequent coaxial convolution with at least one substantially straight-line chordal portion by stretching the wire against a straight-line portion of the mandrel thread groove, continuing the forming of a second number of convolutions of the kind and in the manner of said first number of convolutions and coaxial therewith, and guiding said coiling wire during the formation of said first number of convolutions, said chordal portion and said second number of convolutions, so as to prevent the wire from tilting about its own axis.

2. A method as in claim 1, wherein a plurality of chordal portions are formed adjacent one another, said plurality of chordal portions being between said first and said second number of convolutions wherein all the chordal portions are being guided in the same manner.

3. A method of making a self-locking wire coil screw thread insert which comprises the steps of gripping a short end portion of a springy wire of a stock wherein said wire has a diamond-shaped cross-section so that said gripped end constitutes a tang of the coil to be produced, winding said wire about a screw threaded mandrel by applying a torque to said mandrel and said tang so as to rotate said mandrel and tang about the mandrel axis substantially at right angles to the plane of said tang and, while subjecting the wire coming from said stock to a back tension, causing a relative movement in the direction of said axis between said rotating gripped end and a stationary feeding point of the wire so as to form said wire into a first predetermined number of equally pitched convolutions of equal diameter while holding said forming convolutions in coaxial relationship to each other, wherein the points of one of the acute angles of the diamond wire cross-sections are closest to said axis, further forming a subsequent convolution with a plurality of adjoining straight-line chordal portions having outer corners on diameters of a length similar to that of the outer diameter of said first number of convolutions by stretching the wire under said back tension against mandrel thread groove portions straight-line surfaced according to the desired chordal portions, continuing the forming of a second number of convolutions of the kind and in the manner of said first number of convolutions so that all convolutions are coaxial, guiding said coiling wire during the formation of said numbers of convolutions and said chordal portions so as to prevent the wire from tilting about its own axis, severing the produced coil from the stock and discontinuing the application of said torque whereby owing to the release of said back tension each coil will springingly expand so as to become free from said grip and said mandrel.

4. A method of making a self-locking wire coil screw thread insert which comprises the steps of gripping the end of a springy wire of a stock, wherein the wire has a diamond-shaped cross-section, winding said wire about a screw threaded mandrel by rotating said mandrel and said gripped end about the mandrel axis and simultaneously moving said end in the direction of said axis and away from a stationary wire-feeding point so as to form said wire into a first predetermined number of convolutions of a cylindrical coil of a constant diameter and constant helix angle of the inner screw thread forming portion, while holding said forming convolutions in co-axial relationship to each other, further forming a subsequent coaxial convolution with at least one substantially straight-line chordal portion by stretching the wire against a straight-line portion of the mandrel thread groove while directing such stretching between the ends of said chordal portion in respect to the coil axis at an angle slightly larger than said helix angle of said first number of convolutions thereby blending both ends of the chordal portion into the helix of the adjacent convolutions, continuing the forming of convolutions of the kind and in the manner of said first number of convolutions and coaxial therewith, and guiding said coiling wire during the formation of said convolutions and said chordal portion so as to prevent the wire from tilting about its own axis.

5. A method of making a self-locking wire coil screw thread insert which comprises the steps of gripping the end of a springy wire of a stock, wherein the wire has a diamond shaped cross-section, winding said wire about a screw threaded mandrel by rotating said gripped end about the mandrel axis and simultaneously moving said end in the direction of said axis so as to form said wire into a first predetermined number of equally pitched convolutions of equal diameters while holding said forming convolutions in coaxial relationship to each other, further forming subsequent coaxial straight-line chordal portions by stretching the wire between the ends of each chordal portion against straight-line portions of the mandrel thread groove, respectively, said chordal portions alternating with short portions of convolutions of the first kind, continuing the forming of convolutions of the kind and in the manner of said first number of convolutions and coaxial therewith, and guiding said coiling wire during the formation of said convolutions and said chordal portions, so as to prevent the wire from tilting about its own axis.

6. A method of making a self-locking wire coil screw thread insert which comprises the steps of inserting the end of a springy wire from a stock, wherein the wire has a diamond shaped cross-section into the free slotted end of a screw threaded mandrel having a V-shaped thread groove, rotating said mandrel while holding said wire coming from said stock under back tension so as to coil a first portion of said wire on a portion of the thread groove of said mandrel, further forming a subsequent wire portion chordal in respect to said coiled wire portion by stretching it into a substantially straight line, V-shaped, indentation within the mandrel thread groove, continuing coiling a third wire portion in the manner said first portion has been coiled and coaxial therewith, holding said coiling wire, during the formation of said coiled portions and said chordal portion, in said V-shaped thread groove and indentations so as to prevent the wire from tilting about its own axis, severing the finished insert from said stock and stopping said rotation whereby causing said finished insert springingly to expand so as to leave said slot and to be readily stripped from said mandrel.

7. A tool for forming a mid-grip self-locking wire coil screw thread insert consisting of a rotatable mandrel provided with a standard V-shaped screw thread groove adapted to receive therein the complementarily V-shaped inner portion of a wire coiled on said mandrel so as to prevent the wire during the coiling from tilting about its own axis, said stanadrd screw thread groove being interrupted by a straight line indentation of a cross-sectional angle substantially equal to that of said thread groove, said indentation forming a chord with respect to the helix of said thread groove so that the center line of said indentation is in continuation of the center line of said thread groove, the helix angle of said indentation in respect to a plane at right angles to the mandrel axis being greater than the helix angle of the standard thread groove and being substantially equal to $\cot^{-1}(\pi DN)$ wherein D is the minimum diameter of said grooxe, and N is the number of thread groove convolutions per inch of the mandrel length.

References Cited in the file of this patent

UNITED STATES PATENTS

| | | |
|---|---|---|
| 518,099 | Ecaubert | Apr. 10, 1894 |
| 1,191,514 | Jameton | July 18, 1916 |
| 2,192,260 | Fisher et al. | Mar. 5, 1940 |
| 2,360,047 | Camniez | Oct. 10, 1944 |
| 2,393,804 | Nigro | Jan. 29, 1946 |
| 2,636,523 | Hammerschlag | Apr. 28, 1953 |
| 2,755,699 | Forster | July 24, 1956 |

FOREIGN PATENTS

| | | |
|---|---|---|
| 466,812 | France | Mar. 13, 1914 |